(12) United States Patent
Jafary et al.

(10) Patent No.: US 9,804,956 B2
(45) Date of Patent: Oct. 31, 2017

(54) AUTOMATED TESTING OF WEBPAGES

(71) Applicant: American Express Travel Related Services Company, Inc., New York, NY (US)

(72) Inventors: Mansoor Jafary, Scottsdale, AZ (US); Robert B. Mawk, Scottsdale, AZ (US); Nagaraj S. Pandit, Peoria, AZ (US); Ganeshbabu G. Subramanian, Glendale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 14/823,706

(22) Filed: Aug. 11, 2015

(65) Prior Publication Data

US 2017/0046251 A1 Feb. 16, 2017

(51) Int. Cl.
*G06F 11/00* (2006.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
USPC .......................................... 714/33
See application file for complete search history.

(56) References Cited

U.S. PATENT DOCUMENTS

| 2010/0070231 A1* | 3/2010 | Hanumant | G06F 11/368 702/123 |
| 2016/0004628 A1* | 1/2016 | Gugri | G06F 11/3688 717/124 |

* cited by examiner

*Primary Examiner* — Sarai Butler
(74) *Attorney, Agent, or Firm* — Snell & Wilmer L.L.P.

(57) ABSTRACT

A test script may be written in a test script configuration spreadsheet. A plurality of test scripts may be listed in a test suite spreadsheet. A user may hit a run key to execute all or any subset of the test scripts listed in the test suite spreadsheet. A test engine may read the test suite spreadsheet and the test script configuration spreadsheets to execute the test scripts on any platform or browser specified by the test suite spreadsheet.

20 Claims, 4 Drawing Sheets

| TESTCASE | DESCRIPTION | USERNAME | EXECUTE | BROWSER | BROWSER VERSION | PLATFORM | URL |
|---|---|---|---|---|---|---|---|
| AUTO_MINDUE | VALIDATE MIN DUE | USER1 | YES | FIREFOX | 36.0 | WINDOWS 7 | WWW.EXAMPLE1.COM |
| AUTO_CURRENTACTIVITY | VALIDATE CURRENT ACTIVITY | USER1 | YES | INTERNET EXPLORER | 11.0 | WINDOWS 8 | WWW.EXAMPLE2.COM |
| AUTO_CURRENTBALANCE | VALIDATE CURRENT BALANCE | USER2 | YES | CHROME | 30.0 | WINDOWS 7 | WWW.EXAMPLE3.COM |
| NONMR_SUPP | VALIDATE CARD REG PENDING CHARGES | USER2 | YES | FIREFOX | 37.0 | WINDOWS 8 | WWW.EXAMPLE4.COM |
| AUTO_CLICK | VALIDATE TOOLTIP CLICK & TEXT | USER3 | NO | INTERNET EXPLORER | 11.0 | WINDOWS 7 | WWW.EXAMPLE5.COM |
| AUTO_TEMPLATE3 | VALIDATE CARD REG PENDING CHARGES LABEL AND COUNT_1 | USER3 | NO | CHROME | 30.0 | WINDOWS 8 | WWW.EXAMPLE6.COM |

| TESTCASE | DESCRIPTION | USERNAME | EXECUTE | BROWSER | BROWSER VERSION | PLATFORM | URL |
|---|---|---|---|---|---|---|---|
| AUTO_MINDUE | VALIDATE MIN DUE | USER1 | YES | FIREFOX | 36.0 | WINDOWS 7 | WWW.EXAMPLE1.COM |
| AUTO_CURRENTACTIVITY | VALIDATE CURRENT ACTIVITY | USER1 | YES | INTERNET EXPLORER | 11.0 | WINDOWS 8 | WWW.EXAMPLE2.COM |
| AUTO_CURRENTBALANCE | VALIDATE CURRENT BALANCE | USER2 | YES | CHROME | 30.0 | WINDOWS 7 | WWW.EXAMPLE3.COM |
| NONMR_SUPP | VALIDATE CARD REG PENDING CHARGES | USER2 | YES | FIREFOX | 37.0 | WINDOWS 8 | WWW.EXAMPLE4.COM |
| AUTO_CLICK | VALIDATE TOOLTIP CLICK & TEXT | USER3 | NO | INTERNET EXPLORER | 11.0 | WINDOWS 7 | WWW.EXAMPLE5.COM |
| AUTO_TEMPLATE3 | VALIDATE CARD REG PENDING CHARGES LABEL AND COUNT_1 | USER3 | NO | CHROME | 30.0 | WINDOWS 8 | WWW.EXAMPLE6.COM |

FIG. 2

| COMMAND | ELEMENT | ELEMENTVALUE | ACTION | EXPECTED DATA |
|---|---|---|---|---|
| WAITUNTIL | ID | LILO_USERNAME | | |
| FIND | ID | LILO_USERNAME | SEND_KEYS | USER2 |
| FIND | ID | LILO_PASSWORD | SEND_KEYS | FLOWER1 |
| FIND | ID | LILO_FORMSUBMIT | CLICK | |
| WAITUNTIL | TAG | AH-NOLOYALTY-MSG1 | TEXT_EQUALS | MY ACCOUNT SUMMARY |
| FIND | ID | AH-NOLOYALTY-MSG2 | TEXT_CONTAINS | MEMBERSHIP |
| FIND | ID | AH-NOLYALTY-MSG2 | TEXT_CONTAINS | CARD BENEFITS |
| FIND | ID | AH-USE-POINTS | TEXT_EQUALS | VIEW BENEFITS |
| FIND_ATTR | ID_ATTR | AH-USE-POINTS,HREF | TEXT_EQUALS | WWW.EXAMPLE7.COM |
| CLOSEBROWSER | | | | |

FIG. 3

AUTOMATED TESTING OF WEBPAGES

FIELD

The present disclosure relates to testing webpage and native application functionality.

BACKGROUND

New webpage functions and native applications typically need to be tested before they are implemented in a live environment. Typical testing methods require knowledge of specialized automation tools and scripting languages, such as VB Script or CSharp. Such skills, tools and languages limit resources that can be allocated to automation testing. Due to the amount of time it takes to document automation scripts, it may take a longer amount of time to complete automation testing. The long testing time may increase costs and delay the time to market for new functionalities.

SUMMARY

A system, method, and/or computer readable medium (collectively, the "system") is disclosed for automated testing of webpage and native application functionality. The system may perform operations comprising identifying a plurality of test scripts in a test suite spreadsheet. The system may access a test script configuration spreadsheet for a test script in the plurality of test scripts. The system may launch a browser specified in the test suite spreadsheet for the test script. The system may execute the test script according to commands in the test script configuration spreadsheet.

In various embodiments, the test suite spreadsheet may comprise a test name column, a description column, a user name column, an execute column, a browser column, a browser version column, a platform column, and a URL column. The test script configuration spreadsheet may comprise a command column, an element column, an element value column, an action column, and an expected data column. The system may determine whether the test script has passed. The system may capture, in response to the test script failing, a screen shot and upload the screen shot to a quality center. The system may upload the test script to a test suite spreadsheet. The system may execute the plurality of test scripts in the test suite spreadsheet.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 2 illustrates an exemplary test suite, in accordance with various embodiments;

FIG. 3 illustrates an exemplary test configuration spreadsheet, in accordance with various embodiments.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

An automated testing method may comprise utilizing spreadsheets which are driven by a test execution engine. A spreadsheet may include execution commands and steps in software readable language, along with success and failure criteria for a test case. The spreadsheet may be used to upload test scripts to a test management tool, such as HP Quality Center. The test execution process may be implemented as a standalone or initiated through the test management tool using a built-in or custom plug-in. The test execution process can automate execution, validation of results based on success criteria, update status of test cases as pass or fail, and/or upload test results.

The automated testing method may allow for rapid testing of test scripts on multiple browsers and platforms. Additionally, a tester with limited knowledge of advanced scripting languages may be able to utilize the method by entering script information in a spreadsheet. Thus, the time and resources involved in testing may be reduced, which may increase the speed to market for new applications and functionalities.

Figure 1:
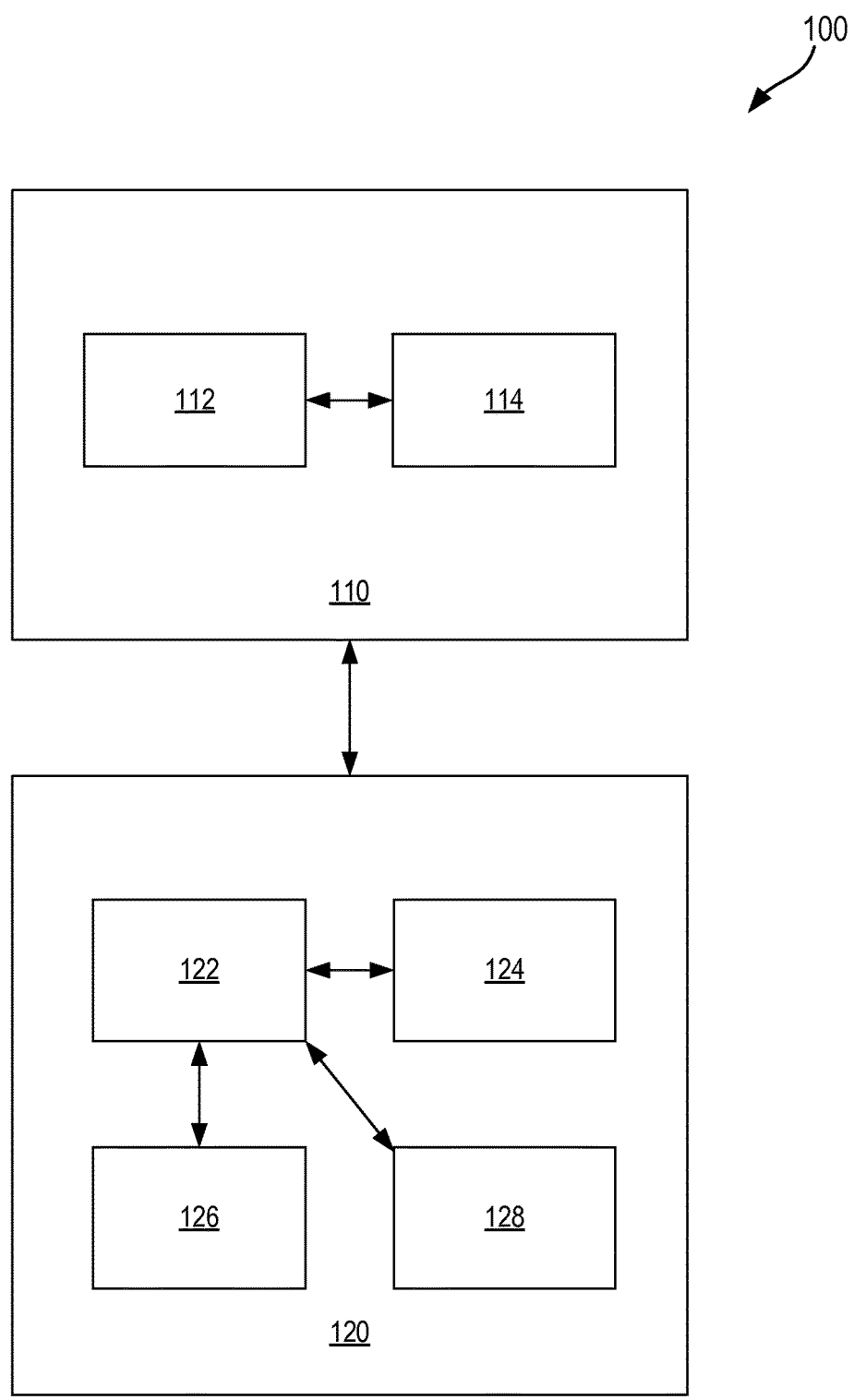
FIG. 1 illustrates an exemplary system for testing application functionality, in accordance with various embodiments.

Referring to FIG. 1, a system 100 for automated testing is illustrated, according to various embodiments. The system may comprise a quality center 110 and a test execution framework 120. The quality center 110 may comprise a test suite 112 and a QC plug-in 114. The test suite 112 may comprise a spreadsheet which identifies the scripts which are to be tested. The QC plug-in 114 may be configured to automate testing of the scripts identified in the test suite 112. The QC plug-in 114 may read the test suite 112 and transmit instructions to the test execution framework 120 to execute the scripts identified in the test suite 112.

The test execution framework 120 may comprise a script driver 122, a test engine 124, a test configuration spreadsheet 126, and a reporting module 128. The script driver 122 may comprise a JAVA application configured to invoke the test engine 124. The test engine 124 may comprise a JAVA application configured to read and execute the test configuration spreadsheet 126. The test configuration spreadsheet 126 may comprise a spreadsheet with the commands for each script in the test suite 112. The test engine 124 may be configured to execute the scripts on browsers and devices specified in the test configuration spreadsheet 126. The test engine 124 may be configured to return results of the tests to the reporting module 128. The reporting module 128 may return the results to the quality center 110.

Referring to FIG. 2, an example of a test suite 200 is illustrated according to various embodiments. The test suite 200 may comprise a spreadsheet with a variety of data. A test name column 210 may list a plurality of scripts to be tested. A description column 220 may provide a short description of each script. A user name column 230 may specify a user name which should be utilized for the test. An execute column 240 may indicate whether the specific script should be executed in response to the system being instructed to test the scripts in the test suite 200. A browser column 250 may indicate which browser each script should be executed on. A browser column 260 may indicate which browser version should be used to test the script. A platform column 270 may identify which platform should be used to test the script. A URL column 280 may identify the location where the script is to be tested.

Referring to FIG. 3, an example of a test configuration spreadsheet 300 is illustrated, according to various embodiments. The system may comprise a test configuration spreadsheet for each script listed in the test suite 200. The test configuration spreadsheet 300 may comprise a command column 310. The command column 310 may identify what action should be executed by the test engine. For example, the WAITUNTIL command instructs the test engine to wait until an element is present as a webpage loads. The FIND command instructs the test engine to find an element on the webpage. The CLOSEBROWSER command instructs the test engine to close the browser once the script is complete. An element column 320 may specify what type of element the test engine should search for. For example, the ID element may indicate that the element is a data field. The TAG element may indicate that the element is a webpage title. An element value column 330 may identify which specific element the test engine should search for. For example, a lilo_userName element value may indicate that the test engine should search for a user name data field. A lilo_passsword element value may indicate that the test engine should search for a password data field. A lilo_formSubmit element value may indicate that the test engine should search for a button to submit information. An action column 340 may indicate which type of action the test engine should take on the element. For example, a SEND_KEYS action may instruct the test engine to enter data into a data field. A CLICK action may instruct the test engine to click on or otherwise select an element. A TEXT_EQUALS action may instruct the test engine to determine if the data present in the element is equal to an expected value. A TEXT_CONTAINS action may instruct the test engine to determine if the data present in the element contains an expected value.

Figure 4:
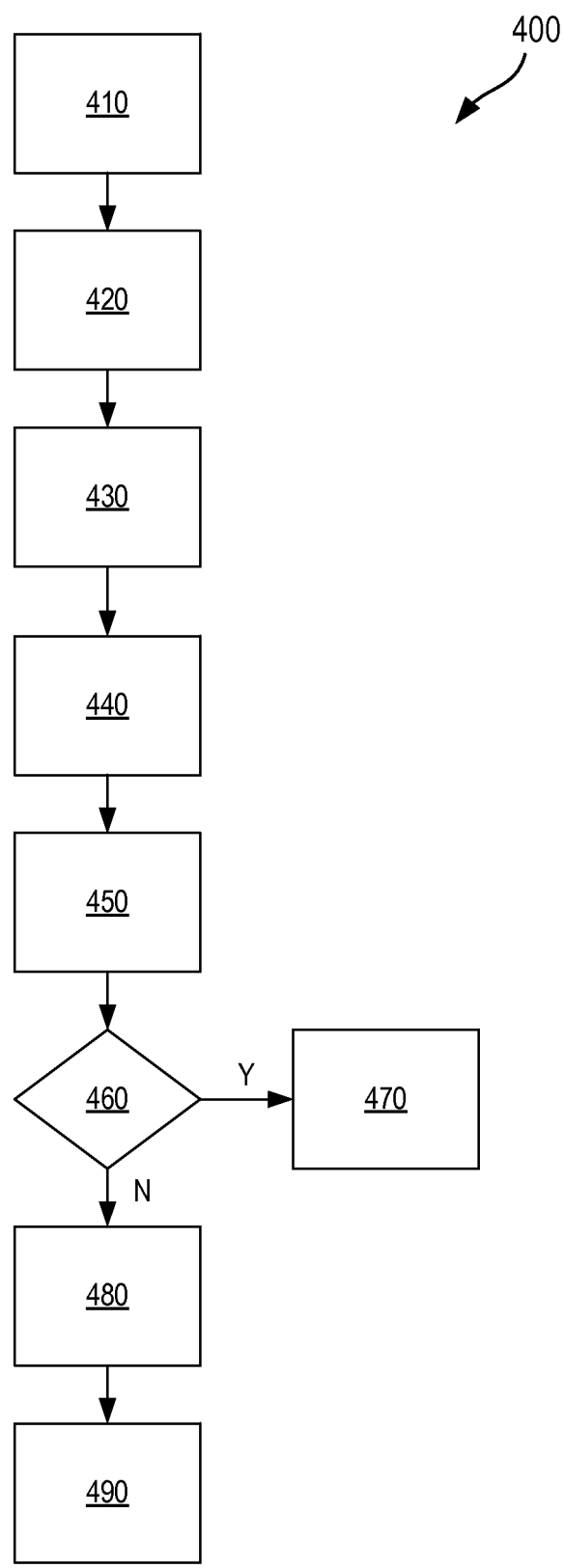
FIG. 4 illustrates an exemplary process for testing application functionality, in accordance with various embodiments.

Referring to FIG. 4, a process for testing webpages is illustrated, according to various embodiments. A developer or other user may write a test script in a spreadsheet to test a functionality of a webpage or native application (step 410). The test script may comprise information such as commands, elements, element values, actions, and expected data. The test script may be uploaded to a quality center (step 420). The test script may be added to a test suite spreadsheet which contains a plurality of test scripts. The test suite spreadsheet may comprise information such as the script name, script description, user name, browser, browser version, platform, and URL location. A user may hit Run to execute the scripts in the test suite spreadsheet (step 430). Hitting run may trigger a QC plug-in. The QC plug-in may invoke a script driver program. The script driver may invoke a test engine Java application. The test engine reads the test script and executes the test script according to the specified configuration (step 440). The test engine launches the specified browser or native application to test the test script (step 450). For example, the test script may specify that the test script should be tested on Internet Explorer®, Firefox®, iOS®, Android®, or any other browser or native application. The test engine may determine whether the test has passed (step 460). For example, the test script may identify an expected value which should be observed. In response to the test passing, the test engine may update the quality center with the test execution status as passed (step 470). In response to the test failing, the test engine may update the quality center with the test execution stats as failed (Step 480). The test engine may upload screen shots of the failed test in the quality center (step 490).

The various system components may communicate over a network. As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

In various embodiments, data stored in the various databases may comprise a collection of data including and/or originating from customer information, transaction information, account information, record of sales, account history, customer history, sensor data, machine log data, data storage system, public web data, and/or social media. Data may be collected from multiple sources and amalgamated into a big data structure such as a file, for example. In that regard, the data may be used as an input to generate metadata describing the big data structure itself as well as the data stored in the structure.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, Windows 8®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing, which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998);

(3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
identifying, by a computer, a plurality of test scripts in a test suite spreadsheet, wherein the test suite spreadsheet comprises a list of the plurality of test scripts, wherein each of the plurality of test scripts identifies a different test script configuration spreadsheet in a plurality of test script configuration spreadsheets;
accessing, by the computer, a test script configuration spreadsheet in the plurality of test script configuration spreadsheets for a test script in the plurality of test scripts, wherein the test script configuration spreadsheet comprises a plurality of commands to be executed by the computer for the test script, wherein the test script configuration spreadsheet identifies a plurality of browsers in which to execute the test script;
launching, by the computer, a browser specified in the test suite spreadsheet for the test script; and
executing, by the computer, the test script in the test suite spreadsheet according to the plurality of commands in the test script configuration spreadsheet.

2. The method of claim 1, wherein the test suite spreadsheet comprises at least one of a test name column, a description column, a user name column, an execute column, a browser column, a browser version column, a platform column, or a URL column.

3. The method of claim 1, wherein the test script configuration spreadsheet comprises at least one of a command column, an element column, an element value column, an action column, or an expected data column.

4. The method of claim 1, further comprising determining, by the computer, that the test script has passed.

5. The method of claim 1, further comprising:
capturing, by the computer and in response to the test script failing, a screen shot; and
uploading, by the computer, the screen shot to a quality center.

6. The method of claim 1, further comprising uploading, by the computer, the test script to the test suite spreadsheet.

7. The method of claim 1, further comprising executing, by the computer, the plurality of test scripts in the test suite spreadsheet.

8. A system, comprising:
a processor,
a tangible, non-transitory memory configured to communicate with the processor, the tangible, non-transitory memory having instructions stored thereon that, in response to execution by the processor, cause the processor to perform operations comprising:
identifying, by the processor, a plurality of test scripts in a test suite spreadsheet, wherein the test suite spreadsheet comprises a list of the plurality of test scripts, wherein each of the plurality of test scripts identifies a different test script configuration spreadsheet in a plurality of test script configuration spreadsheets;
accessing, by the processor, a test script configuration spreadsheet in the plurality of test script configuration spreadsheets for a test script in the plurality of test scripts, wherein the test script configuration spreadsheet comprises a plurality of commands to be executed by the computer for the test script, wherein the test script configuration spreadsheet identifies a plurality of browsers in which to execute the test script;
launching, by the processor, a browser specified in the test suite spreadsheet for the test script; and
executing, by the processor, the test script in the test suite spreadsheet according to the plurality of commands in the test script configuration spreadsheet.

9. The system of claim 8, wherein the test suite spreadsheet comprises a test name column, a description column, a user name column, an execute column, a browser column, a browser version column, a platform column, and a URL column.

10. The system of claim 8, wherein the test script configuration spreadsheet comprises a command column, an element column, an element value column, an action column, and an expected data column.

11. The system of claim 8, further comprising determining, by the processor, whether the test script has passed.

12. The system of claim 8, further comprising:
capturing, by the processor and in response to the test script failing, a screen shot; and
uploading, by the processor, the screen shot to a quality center.

13. The system of claim 8, further comprising uploading, by the processor, the test script to the test suite spreadsheet.

14. The system of claim 8, further comprising executing, by the processor, the plurality of test scripts in the test suite spreadsheet.

15. An article of manufacture including a non-transitory, tangible computer readable storage medium having instructions stored thereon that, in response to execution by a computer, cause the computer to perform operations comprising:
identifying, by the computer, a plurality of test scripts in a test suite spreadsheet, wherein the test suite spreadsheet comprises a list of the plurality of test scripts, wherein each of the plurality of test scripts identifies a different test script configuration spreadsheet in a plurality of test script configuration spreadsheets;
accessing, by the computer, a test script configuration spreadsheet in the plurality of test script configuration spreadsheets for a test script in the plurality of test scripts, wherein the test script configuration spreadsheet comprises a plurality of commands to be executed by the computer for the test script, wherein the test script configuration spreadsheet identifies a plurality of browsers in which to execute the test script;
launching, by the computer, a browser specified in the test suite spreadsheet for the test script; and
executing, by the computer, the test script in the test suite spreadsheet according to the plurality of commands in the test script configuration spreadsheet.

16. The article of claim 15, wherein the test script configuration spreadsheet comprises a command column, an element column, an element value column, an action column, and an expected data column.

17. The article of claim 15, further comprising determining, by the computer, whether the test script has passed.

18. The article of claim 15, further comprising:
   capturing, by the computer and in response to the test script failing, a screen shot; and
   uploading, by the computer, the screen shot to a quality center.

19. The article of claim 15, further comprising uploading, by the computer, the test script to the test suite spreadsheet.

20. The article of claim 15, further comprising executing, by the computer, the plurality of test scripts in the test suite spreadsheet.

\* \* \* \* \*